United States Patent Office 3,529,811
Patented Sept. 22, 1970

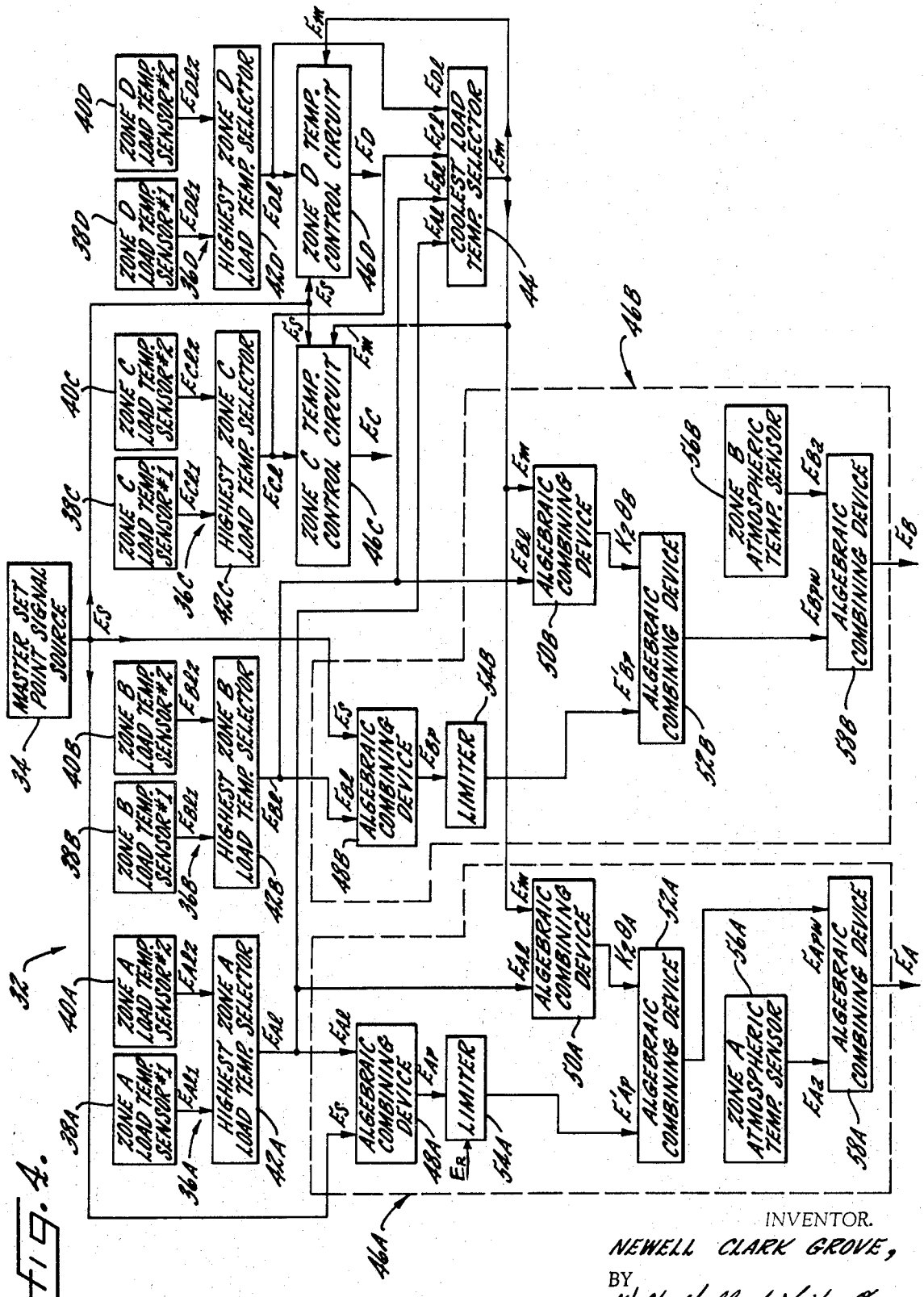

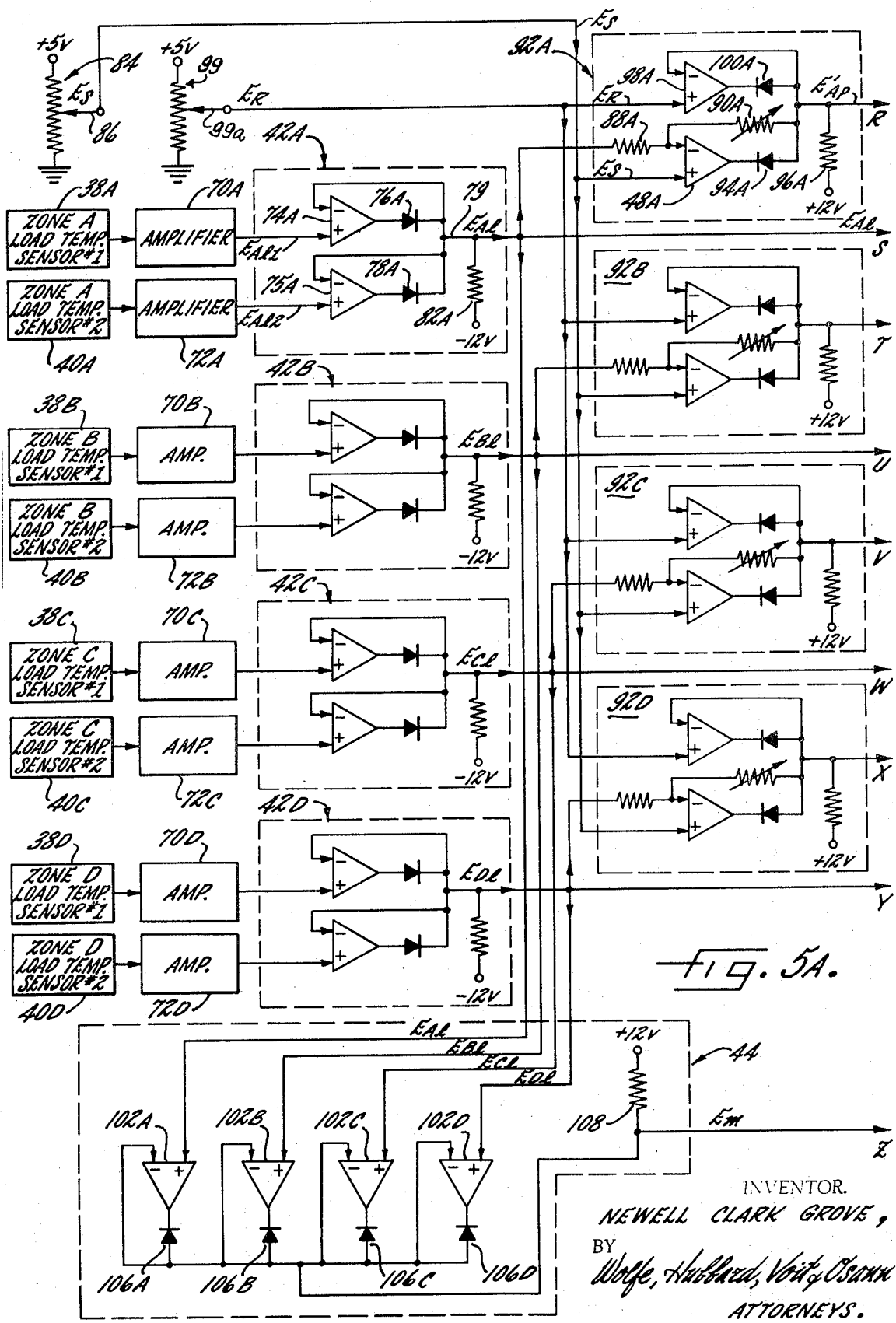

3,529,811
METHOD AND APPARATUS FOR REGULATING BATCH-TYPE HEAT TREATING UNITS
Newell Clark Grove, Rockford, Ill., assignor to Barber-Colman Company, Rockford, Ill., a corporation of Illinois
Filed Nov. 19, 1968, Ser. No. 777,106
Int. Cl. F27b *19/00*
U.S. Cl. 263—10                    27 Claims

ABSTRACT OF THE DISCLOSURE

A method for regulating the rate at which heat is supplied to each of the several furnace zones of a batch-type heating unit to obtain heating of the loads disposed in such zones at the maximum rate consistent with preventing the temperature of any one of them from overshooting a predetermined set point and with maintaining the difference between the temperatures of the hottest and coolest of the loads within an acceptable range. The method involves employing, for each of the zones, respective weighted phantom set points, which can be generally expressed as:

$$T_{pw} = T_s + K_1\Delta - K_2\theta$$

where
$T_{pw}$=the weighted phantom set point for a particular furnace zone,
$T_s$=a predetermined set point,
$K_1$=a predetermined proportionality constant,
$\Delta$=the difference between the set point and the temperature of the zone's load,
$K_2$=a predetermined proportionality constant, and
$\theta$=the difference between the temperature of the zone's load and a reference load temperature.

Also, there is an analog control circuit disclosed for automatically carrying out the regulating method.

BACKGROUND OF THE INVENTION

This invention relates to batch-type heat treating and, more particularly, to a method and apparatus for regulating the rate at which heat is supplied to each of the several furnace zones of a batch-type heat treating unit.

In the past few years, it has been increasingly appreciated that economic considerations of efficiency and capital investment dictate the heat treatment of material batches in the shortest possible time to increase the "turnover" in any given furnace. The heating units employed for this purpose range from sophisticated multizone furnaces to less complex single zone furnaces. Typically, batch heat treating is effected by disposing a plurality of loads of a given material in respective, substantially independently heated furnace zones, and there simultaneously heating them to the same predetermined heat treating or set point temperature.

One of the major problems encountered in batch-type heat treating is that of regulating the heat inputs to the several furnace zones so that the loads are all heated in a minimum or very short time to substantially the same set point temperature but without the load in any zone overshooting the desired final temperature or set point. In some but not all cases, the loads are then maintained at that temperature to soak for a predetermined soaking time. Frequently, the regulation requirements are quite strict in that only slight deviations of the load temperatures from the set point temperature during the soaking period will result in the heat treated load, or end product, having inferior characteristics. For instance, for optimum aging, annealing and homogenizing of aluminum, the aluminum must soak at temperatures within about one percent of the prescribed set point temperature. Moreover, for some heat treating processes, such as homogenizing of aluminum, the prescribed set point temeprature is only very slightly below the melting point. Accordingly, if the temperature regulation is not sufficiently close to avoid overshoot, there is a grave risk of melting the aluminum with the attendant disastrous effects on both the load and the furnace.

Heretofore, different approaches have been taken in attempting to provide the required regulation. One such approach has been to maintain the atmospheres in the several furnace zones at the set point temperature during both the heating and soaking portions of the treatment cycle. This has the advantage that it is relatively simple to hold the furnace zones at this fixed temperature wihout appreciable deviation, but it has the major disadvantage of requiring an extended period to bring the loads up to the set point temperature. This, of course, increases the cycling time (i.e., the period required for heating, soaking and cooling of a batch) which, in turn, creates an inherent inefficiency. Moreover, depending upon whatever dissimilarities may exist between the different furnace zones and the different loads, there may be an appreciable difference in the heating rates of the several loads. In that event, the operator is required to pay close attention to the heating process to assure that all of the loads soak for the prescribed soaking time.

The disadvantages of using only the furnace atmosphere temperature as a control factor have led to the development of a so-called phantom set point temperature regulating method. In this approach, during the heating portion of the treatment cycle, the atmospheric temperature of each of the furnace zones is caused to generally follow a phantom set point profile. The phantom set point profile for each furnace zone is derived by adding to the actual set point or desired final load temperature an amount proportional to the instantaneous difference between the set point temperature and the instantaneous temperature of the load in the particular zone. Accordingly, the atmospheric temperature in a zone may rise above the actual set point during heat up of the load, the load heating rates are increased, and the time for the load to reach set point temperature is reduced. Yet, in this procedure the rate at which heat energy is supplied to the zone must be carefully controlled and slowed down as the load temperature approaches the set point, so as to avoid load temperature overshoot.

Thus, in control with a phantom set point care must be used in selecting the factor of proportionality between the amount added to the set point temperature to derive the phantom set point temperature and the difference between the set point temperature and the load temperature. If the factor is too small, the advantages of the method are substantially reduced and, if it is too large, the load temperature will overshoot the set point temperature. This is an extremely complex problem because the ideal factor of proportionality varies from one furnace zone to another and, for each furnace zone, from one time to another. It also depends upon the size and thermal inertia of the load in the zone which changes from batch to batch. Consequently, it is necessary for those using the phantom set point regulating method to frequently survey the several furnace zones to determine their thermal characteristics, and even then it is most difficult to select factors of proportionality for the several furnace zones that will assure that the loads will all heat to the same predetermined set point temperature. Indeed, where only slight deviations of the load temperatures from the prescribed set point temperature can be tolerated, it is still common practice to employ the

3 fixed atmospheric temperature method of regulation, despite its inherent inefficiency.

SUMMARY OF THE INVENTION

The primary aim of the present invention is to provide a new and improved method and apparatus for regulating the rate at which heat is supplied to each of the substantially independently heated furnace zone of a batch-type heat treating unit. A more specific object is to provide a method and apparatus for rapidly heating the loads disposed in such furnace zones to substantially the same predetermined set point temperature and at substantially the same rate, while maintaining the temperature difference between the hottest and coolest of the loads within a predetermined range. Another related object of this invention is to provide an improved method and apparatus for regulating the rate at which heat is supplied to the furnace zones in accordance with respective weighted phantom set point temperatures so that the thermal characteristics of the zones need be surveyed far less frequently than in previous methods and apparatuses for effecting such regulation in accordance with phantom set point temperatures.

Another object of the invention is to provide a method and apparatus of the foregoing type which can be readily accommodated to different forms of heat treating and to the heat treating of different materials, and which automatically compensates for different sizes or thermal inertias of the loads in different zones or in different batches. A more detailed object is to provide a method and apparatus of the foregoing type which can be readily adjusted between heat treating cycles for whatever changes may be made in the material to be treated or the treatment to be effected.

A further object of the present invention is to provide a method and apparatus of the foregoing type which is effectvie not only to cause the loads to all rapidly heat to substantially a predetermined set point temperature, but also to maintain them at substantially that same temperature throughout a prescribed soaking period despite whatever tendency there may be for the temperature of on or more of the loads to wander.

Still another object of the present invention is to provide a method and apparatus which is suitable for regulating the rate at which heat is supplied to a wide variety of existing and new batch-type heat treating units, including both multi-zone furnaces and other processing apparatus having multiple heating zones, and irrespective of the particular source of heat energy utilized in such furnaces.

Finally, it is an object of the present invention to provide a control system for automatically computing the instantaneous heat head required by each of a plurality of substantially independently heated furnace zones in order to heat the loads disposed therein to substantially the same set point temperature in the shortest possible time without any of the loads appreciably overshooting the set point temperature and with the temperature difference between the hottest and the coolest of the loads being held within a predetermined range.

To accomplish these objects, the method and apparatus of the present invention establish, for each furnace zone, a respective weighted phantom set point temperature that reflects not only the difference between the set point temperature and the temperature of the load disposed in the zone, as in the case of prior art methods and apparatuses employing phantom set point temperatures, but also the difference between the load temperature and a reference load temperature. Accordingly, the weighted phantom set point temperatures are adjusted as required to reduce the temperature differences between the several loads to within an acceptable range. Preferably, the temperature of the coolest of the loads is used as the reference load temperature, since this provides the greatest possible assurance that none of the load temperatures will appreciably overshoot the set point temperature. This is

4 very important, since it is relatively simple to raise the temperatures of loads in some zones if they initially lag behind the load temperatures in other zones, by increasing the rate of heat input to the lagging zones; but it is difficult, if not impossible, to cool a load at anywhere near the same rate should the temperature thereof approach the set point temperature at a rate which would result in overshooting, since the furnace does not include means for affirmatively withdrawing heat energy therefrom.

BRIEF DESCRIPTION OF THE DRAWINGS

The specific manner in which the above objects are accomplished, as well as other objects and advantages of the present invention, will become apparent upon reading the following detailed description in conjunction with the attached drawings, in which:

FIG. 4 is a block diagram showing a control system for practicing the present invention in connection with the furnace shown in FIG. 1;

FIGS. 5A and 5B, when joined along the indicated line, are a more detailed diagram, partly in block form and partly in schematic form, of the control system shown in FIG. 4.

DETAILED DESCRIPTION OF THE ILLUSTRATED EMBODIMENT

While the invention will be described in detail hereinafter in connection with a specific illustrated embodiment, it is to be understood that the intent is not to limit it to that embodiment. To the contrary, it is intended here to cover all alternatives, equivalents and modifications that come within the spirit and scope of the present invention as defined by the appended claims.

Figure 1:
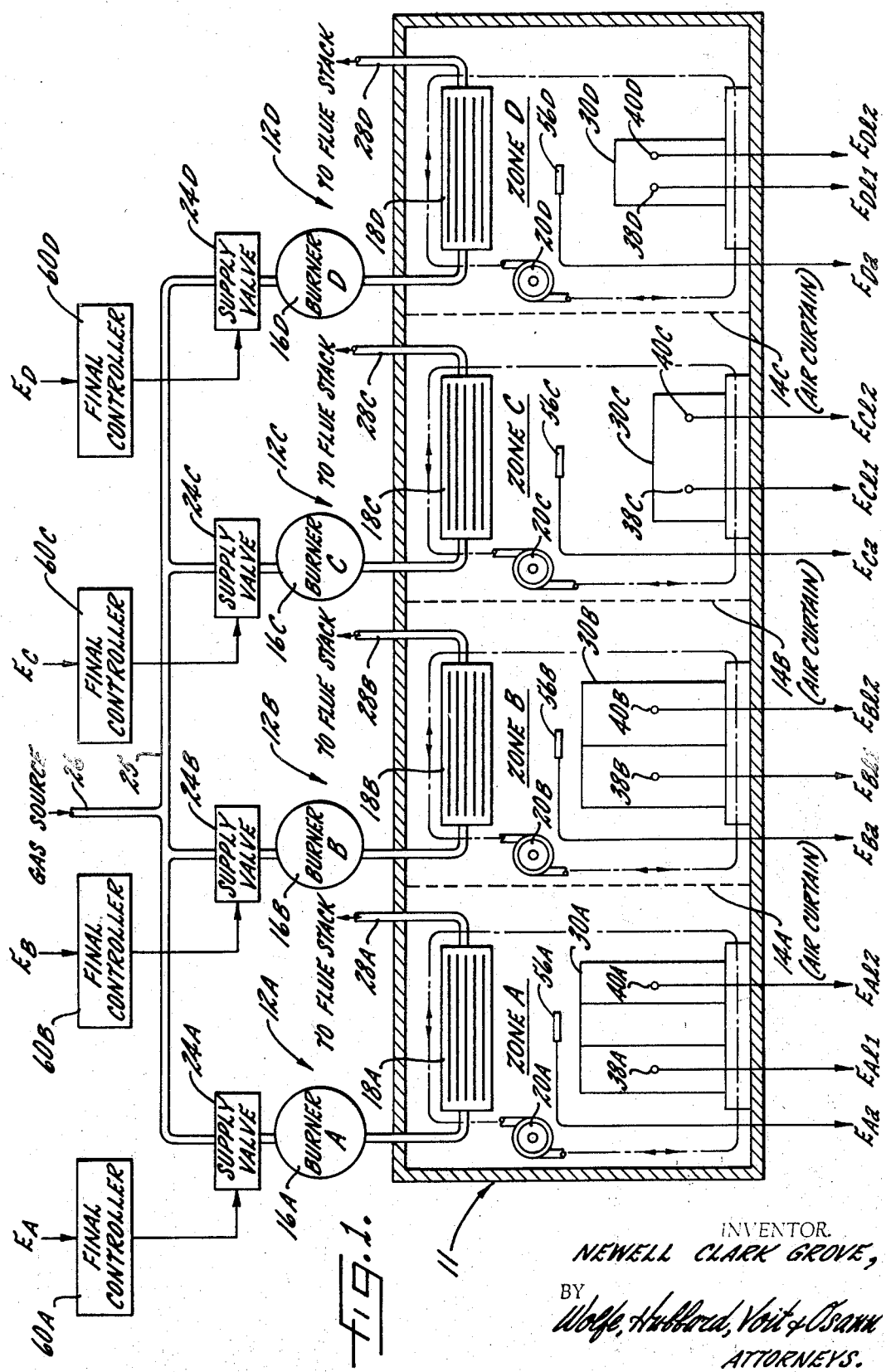
FIG. 1 is a simplified diagrammatic view, partly in section, illustrating a multi-zoned furnace with which the present invention may advantageously be employed.

Turning now to the drawings, and particularly to FIG. 1, the multi-zone furnace 11 there diagrammatically shown is typical of one form of batch-type heat treating unit with which the present invention may advantageously be employed. In keeping with the common construction of multi-zone furnaces, to simplify the problem of maintaining uniform temperatures throughout the furnace 11, the four zones A, B, C and D are supplied with individual and substantially independent heat inputs. To this end, the furnace zones include respective heating units 12A–12D and are thermally isolated, to an appreciable degree, from one another by interposed curtains of circulating air, diagrammatically indicated at 14A–14C. These air curtains are continuously maintained by conventional means (not shown), but which in part may be constituted by fans or blowers 20A–20D.

The particular furnace here illustrated is gas heated. Consequently, the heating units respectively comprise burners 16A–16D, heat exchangers 18A–18D, and blowers 20A–20D. The input sides of the burners 16A–16D are connected through respective control valves 24A–24D to a gas supply line 25 which, in turn, is connected to a gas source main 26, and the output sides are connected through the respective heat exchangers 18A–18D to respective exhaust lines 28A–28D which, in turn, connect with one or more flue stacks (not shown). The input heat supplied to each of the furnace zones A–D by the circulation of hot products of combustion through its respective heat exchanger 18A–18D is distributed throughout the zone by an air current circulated by its respective blower 20A–20D. Accordingly, as heat is supplied, the loads 30A–30D, which are shown as being disposed in the zones A–D, respectively, are heated. Indeed, to assure that each of the loads 30A–30D is uniformly heated throughout, the direction of the heat distributing air currents provided by the blowers 20A–20D may be reversed periodically.

It will be understood that the furnace here shown diagrammatically is exemplary, and is intended to make clear one environment in which the present invention may be employed. Other batch-type heat treating units with which the present invention may be readily employed will be apparent to those skilled in the art.

In accordance with the present invention, the rate at which heat is supplied to the zones A–B is so closely regulated that the loads 30A–30D (a) all heat to substantially the same predetermined set point temperature $T_s$, (b) at substantially the same rapid rate, (c) without the temperature of any of them appreciably overshooting the set point temperature, and (d) with the temperature difference between the hottest and coolest of them being limited to a predetermined acceptable range. To affect this regulation, the atmospheric temperature of each furnace zone is caused to follow a respective weighted phantom set point which is derived on a continuous basis or, at least, at frequent intervals from (1) the predetermined set point temperature, (2) the zone load temperature, and (3) a reference load temperature.

Figure 2:
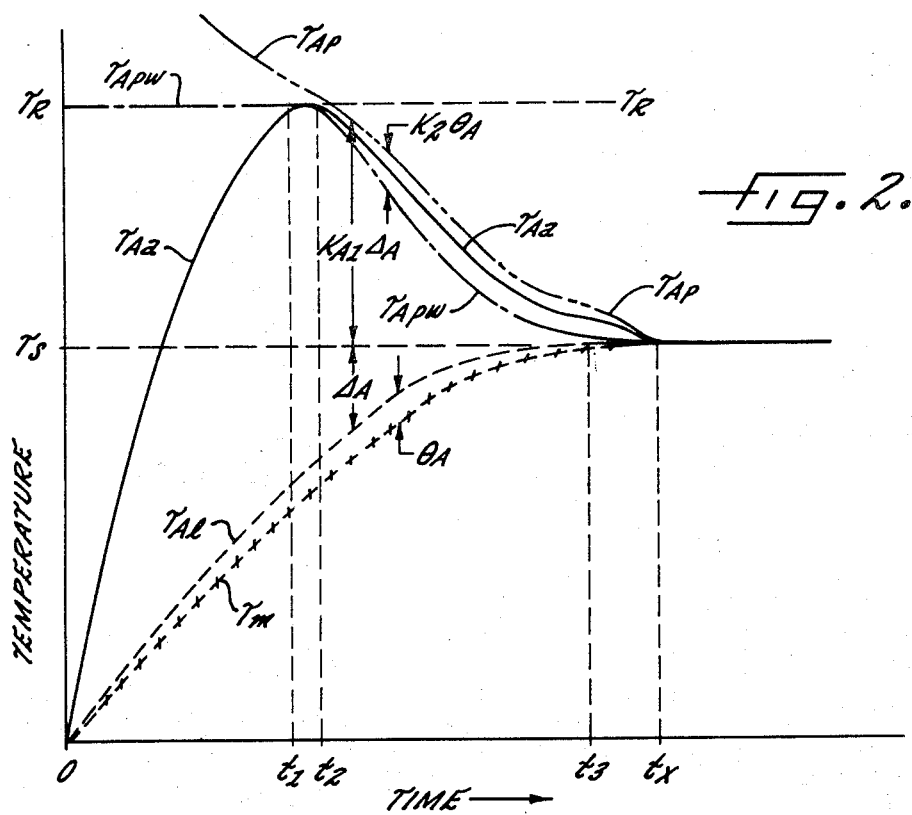
FIG. 2 is a graph illustrating the factors involved in deriving a weighted phantom set point in accordance with the present invention.

More specifically, referring to FIG. 2, to obtain heating of the loads, at the maximum rates consistent with preventing any one of them from overshooting the set point temperature, one of the elements of each of the weighted phantom set points is the so-called phantom set point. To this end, the temperatures of the loads 30A–30D are monitored, and the difference between the predetermined set point and each of the load temperatures, i.e., the load temperature errors $\Delta$, are determined on a continuous basis or, at least, at sufficiently frequent intervals to permit reasonably accurate determination of the load temperature errors. Referring to FIG. 2, at any given time the load temperature error for any given zone, say the zone A, can therefore be expressed as:

$$\Delta_A = T_s - T_{A1} \tag{1}$$

where $T_s$ = the predetermined set point temperature, and
$T_{A1}$ = the instantaneous temperature of the zone A load 30A.

Given the load temperature errors $\Delta_A$ to $\Delta_D$, the instantaneous phantom set point for any one of the zones can be determined by adding to the predetermined set point an amount proportional to the load temperature error for the zone. Accordingly, the expression for the phantom set point at any given time for the exemplary zone A is:

$$T_{Ap} = T_s + K_{A1}\Delta_A \tag{2}$$

where $T_{Ap}$ = the instantaneous phantom set point for zone A, and
$K_{A1}$ = a predetermined constant factor of proportionality for zone A.

As shown in FIG. 2, and as confirmed by Equations 1 and 2, during the early portions of the load heating stage the phantom set point $T_{Ap}$ is at a relatively high level from which it declines to approach the true or desired set point as the load temperature approaches the set point. However, if only the phantom set points are to be used in regulating the rate at which heat is supplied to the furnace zones, the selection of each of the proportionality factors $K_{A1}$ to $K_{D1}$ is most critical. That is, if the proportionality factor for any one zone, say the factor $K_{B1}$, is too small, the load 30B will require an objectionably long time to heat to the set point. On the other hand, if another of the proportionality factors, say $K_{C1}$ is too large, the load 30C will overshoot the set point.

The values to be selected for the proportionality factors $K_{A1}$ to $K_{D1}$ depend upon the thermal characteristics of the furnace zones A to D, respectively, as well as the thermal characteristics of the respective loads. Experience has shown that these selections can be made with sufficient preciseness to assure that the temperatures of the hottest and coolest of the loads will remain within a range of about 10% of one another. However, as previously mentioned, many heat treating processes require that the range between the hottest and coolest of the loads be considerably smaller. Indeed, the permissible deviation between the hottest and coolest of the loads in some processes is as small as 1% of the set point temperature. For that reason, it has been necessary for those employing the so-called phantom set point method to frequently survey the thermal characteristics of the furnace zones so that the factors of proportionality $K_{A1}$ to $K_{D1}$ can be readjusted as necessary to compensate for whatever changes may occur.

This drawback is substantially overcome in accordance with the present invention by weighting the phantom set points to reduce the temperature differences between the loads 30A to 30D to within an acceptable range, and further to somewhat reduce the criticality of selecting precisely appropriate values for the proportionality factors $K_{A1}$ to $K_{D1}$. To this end, the instantaneous difference between each of the load temperatures and a reference load temperature is determined to provide a load temperature deviation $\theta$ for each zone. For example, at any time during heating of the load, the load temperature deviation for zone A is given by:

$$\theta_A = T_{A1} - T_m \tag{3}$$

where $T_m$ = the instantaneous reference load temperature.

Inspection of Equation 3 reveals that the load temperature deviations $\theta_A$ to $\theta_D$ contain the information necessary to appropriately adjust the rates at which heat is supplied to the several zones so as to reduce the temperature difference between the hottest and the coolest of the loads. That is, should the temperature $T_{A1}$ of the load 30A increase significantly relative to the reference load temperature $T_m$, there will be a corresponding increase in the load temperature deviation $\theta_A$. Accordingly, to provide the aforementioned adjustment of the heating rates, the phantom set points for the respective zones are "weighted" by having factors which are proportional to the zone's load temperature deviation subtracted therefrom. Thus, the weighted phantom set point for zone A at any given time can be expressed as:

$$T_{Apw} = T_s + K_{A1}\Delta_A - K_{A2}\theta_A \tag{4}$$

where $T_{Apw}$ = the instantaneous weighted phantom set point for zone A, and
$K_{A2}$ = a gain factor of proportionality for zone A.

The rate at which heat is supplied to any given zone is controlled so that heat energy is added, at a rate greater than that to offset losses to the external atmosphere and thus to cause increases in temperature, only when the weighted phantom set point for the zone is higher than its atmospheric temperature. In this way, the atmospheric temperature of the zone is caused to follow the weighted phantom set point, and is, therefore, automatically reduced as required to prevent the temperature of the zone's load from overshooting the set point and to limit the difference between the zone's load temperature and the temperature of the coolest of the loads.

Figure 3:
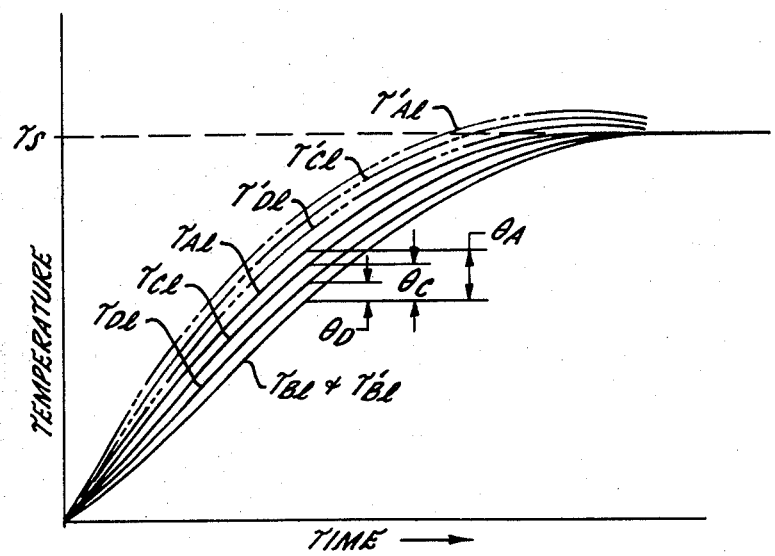
FIG. 3 is a graph showing the effect of employing weighted phantom set points to regulate the rate at which heat is supplied to the zones of the furnace shown in FIG. 1.

Turning to FIG. 3, where the load temperatures using phantom set points but without the weighting are indicated by the curves labeled $T'_{A1}$ to $T'_{D1}$ and where the load temperatures resulting from the use of the weighted phantom set points are shown by the curves labeled $T_{A1}$ to $T_{D1}$, the proportionality factor $K_{A2}$ for zone A is determined from the ratio of the normal difference between the temperatures of the loads in zone A and the coolest load zone when the phantom set point method of temperature regulation is used to the maximum difference that can be tolerated in the particular heating treating process. For example, assuming that the hottest and coolest of the loads are 30A and 30B, respectively, and that the normal difference between their temperatures $T'_{A1}$ and $T'_{B1}$, respectively, is 80° F., and that only a 10° F. difference can be tolerated if the treated loads are to have uniform characteristics, the proportionality constant $K_{A2}$ would be selected to have a value of 8. Of course, this proportionality constant may be made larger with an increased reduction in the difference between the temperature of the zone A load and coolest of the loads. However, inspection of Equation 4 indicates that the weighting factor actually decreases the rate at which the hotter loads are heated. Accordingly the proportionality constant $K_2$ for each zone is preferably made no larger than required to maintain the load temperatures within whatever range is necessary to obtain uniform characteristics of the treated loads.

The reference load temperature is preferably the temperature of the coolest of the loads. In this way, should the heat loss characteristics of one or more of the zones, or the size of the load placed therein, change so as to create a tendency for the zone load temperature to overshoot the set point, this tendency will be overcome sufficiently to at least reduce the overshoot to a negligible level so long as at least one of the loads has no tendency to overshoot the set point. This, of course, is the maximum protection against excessive heating of the loads that can be obtained without objectionable frequent surveying of the thermal characteristics of the furnace zones. Indeed, as will be appreciated, the present invention does not entirely do away with the need to determine the thermal characteristics of the furnace zones, but it does substantially reduce the frequency with which surveys of these characteristics need be conducted. Moreover, by using the temperature of the coolest of the loads as the reference load temperature, there is the substantial advantage of having a reference to compensate for errors in selecting the factors of proportionality $K_{A1}$ to $K_{D1}$. That is, only one of these, say the factor $K_{B1}$ need be sufficiently precisely selected to assure that none of the loads will overshoot the set point. For example, with proper selection of $K_{B1}$, $K_{A1}$ can be larger than its optimum value and the load 30A will still not overshoot the set point because of the factor $K_{A2}\theta_A$ in its weighted phantom set point.

It should be noted that during the early part of the heating portion of the treatment cycle, the weighted phantom set points may exceed the rated maximum temperatures for the furnace zones. In that event, to protect the furnace zones from overheating, it is necessary to limit the weighted phantom set point to a level no higher than the rated maximum temperature, say $T_R$, for the zones.

One of the primary features of the present invention is that the regulating process hereinbefore described is readily adaptable to being carried out automatically by relatively simple and economic control circuitry.

For example, FIG. 4 illustrated a control system 32 in which there is a master set point signal source 34 for providing a reference signal or voltage $E_s$ that is representative of the predetermined set point. Moreover, the control system 32 further includes, for each of the zones A to D, a respective load temperature sensing means for providing an output signal or voltage $E_{A1}$, $E_{B1}$, $E_{C1}$, $E_{D1}$ that is representative of the temperature of the associated load, and a respective control channel 46A to 46D for deriving a weighted phantom set point $E_{Apw}$ to $E_{Dpw}$ and employing it to control the rate at which heat is supplied to the zone.

There are, of course, numerous ways in which the temperatures of the loads 30A to 30D may be converted to signaled values. Indeed, there are a variety of temperatures, such as the peak temperature and the average temperature, that may be used in deriving the weighted phantom set points. Accordingly, it will be understood that the temperature sensing means 36A to 36D shown are only typical of one type that may suitably be employed. With that in mind, it will be seen that the temperature sensing means 36A to 36D that are shown are identical and that an exemplary one of them, the means 36A, comprises a pair of temperature sensors 38A and 40A, specifically a pair of thermocouples (FIG. 1) and a selector 42A. This arrangement is used so that the output signal $E_{A1}$ of the temperature sensing means 36A is representative of the temperature at the hottest side of the load 30A regardless of the direction of the air current provided by the blower 20A and even if the direction of the air current is reversed. To this end, the temperature sensors 38A and 40A monitor the local temperatures at the opposite sides of the load 30A and provide signals $E_{A11}$ and $E_{A12}$, respectively, which are representative of these temperatures. The signals $E_{A11}$ and $E_{A12}$ are, in turn, applied to the input of the selector 42A in which the largest of the two, the one representative of the greatest local temperature, is selected as the output signal $E_{A1}$.

As previously mentioned, in deriving the weighted phantom set points for the zones A to D, the temperature of the coolest of the loads is preferably employed as the reference load temperature. For this reason, in the control system 32 there is a selector 44 which is coupled to receive the output signal $E_{A1}$ of the temperature sensing means 36A, as well as the corresponding output signals $E_{B1}$, $E_{C1}$ and $E_{D1}$ of the other temperature sensing means 36B to 36D. The selector 44 selects the smallest of these, the one representative of the coolest load temperature, as the reference load temperature signal or voltage $E_m$.

Identical control channels 46A to 46D are provided to process the load temperature signals $E_{A1}$ to $E_{D1}$, respectively with the set point reference signal $E_s$ and the reference load temperature signal $E_m$. Accordingly, only the control channel 46A will be described in detail, it being understood that the description applies equally as well to the others.

As shown, the control channel 46A includes a first algebraic combining device 48A which has its reference input coupled to receive the set point reference signal $E_s$ and its control input coupled to receive the load temperature signal $E_{A1}$. The combining device 48A is selected to be of the type that amplifies the difference between the signals applied to its reference and control inputs and adds the amplified difference to the signal applied to its reference input. Accordingly, by appropriate selection of the amplification afforded by the combining device 48A, its output signal $E_{Ap}$ can be expressed as $$E_{Ap} = E_s + K_{A1}(E_s - E_{A1}) \qquad (5)$$

From inspection of Equation 2 it is apparent that the signal $E_{Ap}$ is a representation of the instantaneous phantom set point for zone A.

To derive a signal representing the weighting factor $\theta_A$ for zone A, there is a second algebraic combining device 50A which has its inputs coupled to receive the load temperature signal $E_{A1}$ and the reference load temperature signal $E_m$. This combining device is selected to be of the type that provides an output signal that is simply the amplified difference between the signals applied to its inputs. Accordingly, with appropriate selection of the gain factor $K_{A2}$, the output signal of the combining device 50A can be expressed as:

$$K_{A2}\theta_A = K_{A2}(E_{A1} - E_m) \qquad (6)$$

Inspection of Equation 3 confirms that this represents the instantaneous weighting factor.

The signals for the phantom set point and of the weighting factor are applied to the inputs of a third algebraic combining device 52A which provides an output signal which simply represents the difference voltage. Thus, the output of the third combining device is:

$$E_{Apw} = E_{Ap} - K_{A2}\theta_A \qquad (7)$$

By expanding Equation 7 it is apparent that $$E_{Apw} = E_s + K_{A1}\Delta_A - K_{A2}\theta_A \qquad (8)$$

which, of course, is a representation of the instantaneous weighted phantom set point for zone A.

Now, to protect the furnace zone from overheating, it may be desirable to limit the weighted phantom set point to a level no higher than the maximum permissible temperature $T_R$ for the zone. Inspection of Equation 8 indicates that this can be done by limiting the value of (1) the weighted phantom set point $E_{Apw}$, (2) the load temperature error $\Delta_A$, or (3) the phantom set point $E_{Ap}$. In the particular embodiment illustrated the last of these possible approaches has been adapted and the phantom set point analog is, therefore, passed through a limiter 54A before being applied to the algebraic combining device 52A. Accordingly, with the effect of the limiting considered, the limited phantom set point analog $E'_{Ap}$ is given by:

$$E'_{Ap} = E_s + K_{A1}\Delta_A, \text{ for phantom set points } \leq E_R \qquad (9a)$$

and $$E'_{Ap} = E_R, \text{ for phantom set points } > E_R \qquad (9b)$$

where $E_R$ = the value of the maximum rated furnace temperature $T_R$.

The rate at which heat is supplied to the furnace zone A is regulated by causing its atmospheric temperature to follow the weighted phantom set point. For this reason, there is an atmospheric temperature sensor 56A for monitoring the atmospheric temperature in the immediate proximity of the load 30A (FIG. 1) and for providing a signal or voltage $E_{Aa}$ that is representative of the monitored temperature. In this way, the difference between the weighted phantom set point and the zone atmospheric temperature may be obtained to provide a final control signal $E_A$ by applying the weighted phantom set point and the atmospheric temperature signals to the inputs of a fourth algebraic combining device 58A. In other words, the output of the fourth combining device can be expressed as:

$$E_A = K_{A3}(E_{Apw} - E_{Aa}) \qquad (10)$$

or, in expanded form $$E_A = K_{A3}(E_s + K_{A1}\Delta_A - K_{A2}\theta_A - E_{Aa}) \qquad (11)$$

where $K_{A3}$ = a predetermined gain constant.

It will be appreciated that the control signal $E_A$ is in a form necessary for proportional control of the supply valve 24A. However, the present invention is not limited to proportional control. To the contrary, in the illustrated embodiment, the supply valve 24A may be an on-off type, and the control signal $E_A$ may be converted by a final controller 60A (FIG. 1) to the form required for either simple on-off or modulated type operation of the valve.

Figure 5B:
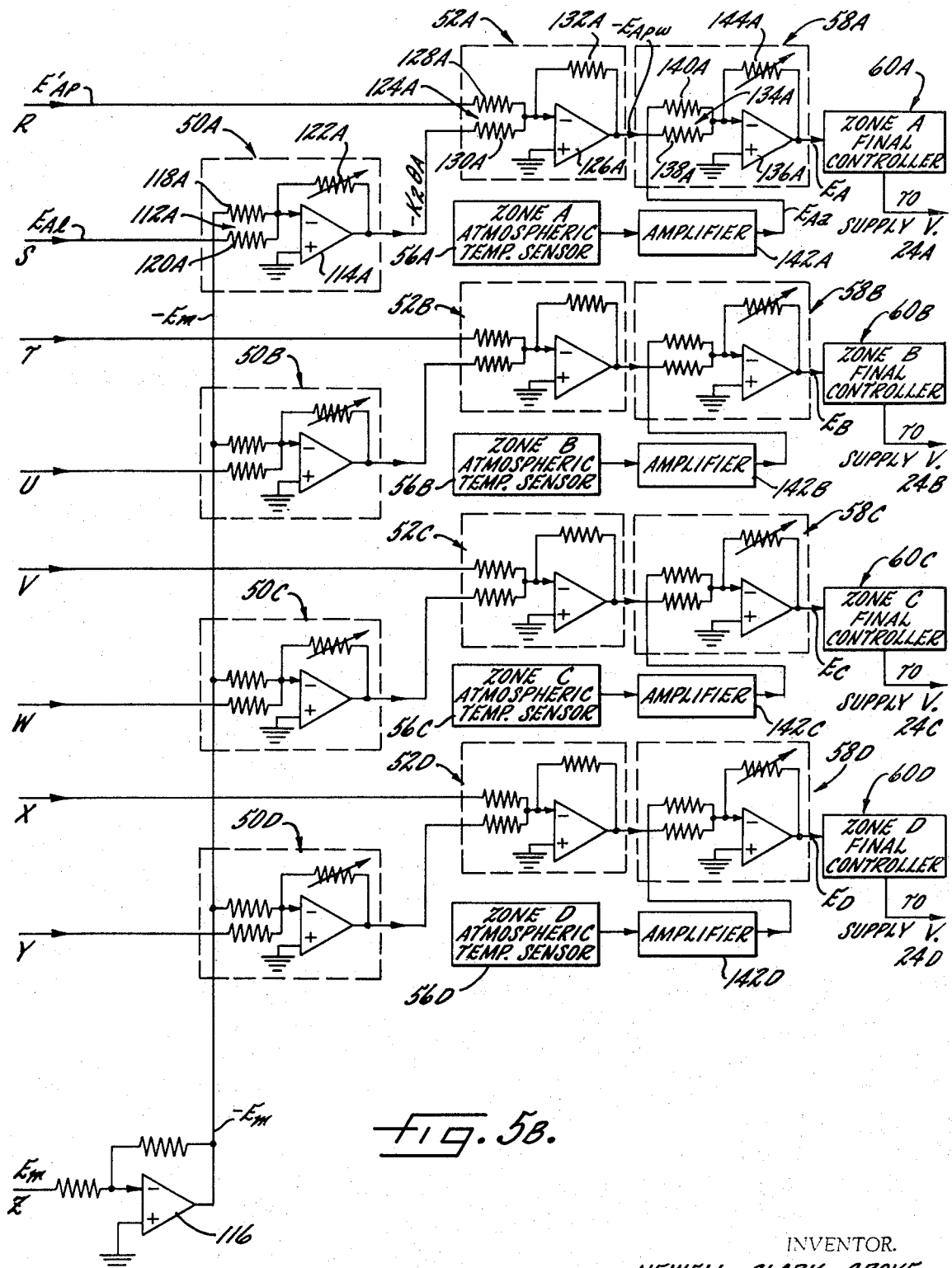

The apparatus represented in block diagram form by FIG. 4 may be constructed in a variety of specific embodiments, and a preferred embodiment, employing analog rather than digital signals, is shown in FIGS. 5A and 5B. In FIG. 5A, the set point signal source 34 is formed by a potentiometer 84 with its upper end connected to a DC voltage source (here, +5 volts) and its lower end connected to a point of reference potential (here shown and hereinafter referred to as ground). By manual adjustment of a wiper 86 slidable along the potentiometer, the voltage $E_s$ appearing on the wiper may be adjusted to correspond in magnitude to any desired set point temperature $T_s$. Merely as an example, the range of set point voltages from 0 to 5 volts may correspond to a range of set point temperatures from 0 to 2000° F.

The two load temperature sensors 38A and 40A are shown in FIG. 5A only in block form. Where those sensors are chosen to be constituted by thermocouples, for example, their voltages are passed through amplifiers 70A and 72A to provide a temperature correlation similar to that established for the set point potentiometer. That is, assuming that the thermocouples provide output voltages which vary over a range of only several millivolts as the sensed temperatures range from 0 to 2000° F., the amplifiers convert such voltages into load temperature signals $E_{A11}$ and $E_{A12}$ which may vary from 0 to 5 volts as the two sensed load temperatures vary from 0 to 2000° F.

The selector 42A (FIGS. 4 and 5A) functions to select and transmit that one of the two zone A load temperature signals which is the largest. In this way, the single load temperature signal for zone A always represents the hottest portion of the load, which may heat up with considerable non-uniformity of temperature. The selector 42A is embodied by two operational amplifiers 74A, 75A having their individual outputs coupled through forwardly poled diodes 76A, 78A to a common output terminal 79, and with feedback from that common terminal to the inverting input terminals (marked with minus symbols) of the amplifiers. The load temperature voltages $E_{A11}$ and $E_{A12}$ are applied to the non-inverting input terminals (marked with plus symbols). The amplifiers 74A, 75A are in this case connected to have unity closed loop gain (although their open loop gains are very high, on the order of 50,000 or more), and thus each would normally function as a voltage follower to reproduce at its output the same voltage supplied to its plus input. The common output terminal is returned through a resistor 82A, which serves as a common load resistor, to a negative 12 volt source.

Let it be assumed for purposes of explanation that the input voltages $E_{A11}$ and $E_{A12}$ are +2 and +3 volts, respectively. The output of amplifiers 74A and 75A thus tend to +2 and +3 volts, and both diodes 76A, 78 tend to be forwardly biased and conductive. The diode 78A will, however, conduct greater current, such that the voltage drop across the resistor 82A is 15 volts and the terminal 79 resides at +3 volts relative to ground. In these circumstances, the diode 76A is reversely biased and non-conductive, so that the signal $E_{A1}$ on terminal 79 is determined by and equal to the larger one of the two input signals $E_{A11}$ and $E_{A12}$, i.e., the signal $E_{A1}$ is +3 volts. Because the negative feedback signal into amplifier 74A is the +3 volt output signals from amplifier 75A, rather than the +2 volt output from amplifier 74A, the latter is driven to have even less than unity gain and the diode 76A is reversely biased by a margin which exceeds the difference between the two input voltages $E_{A11}$ and $E_{A12}$. This means that even when the two input voltages differ only slightly, the larger one will appear on the common output terminal 79. Moreover, because of the high open loop gain and the negative feedback connections as shown, the forward voltage drop across that one of the two diodes which is conductive will have little effect upon the relationship between the larger input voltage and the output voltage $E_{A1}$. Until the latter reaches the level of the former, the negative feedback in the effective one of the amplifiers will be insufficient to reduce the overall gain to unit. In this way, variations in the forward voltage drops across different diodes (ranging from about 0.2 volt to 0.7 volt) cannot result in the output voltage $E_{A1}$ being an inaccurate reproduction of the largest one of the two input voltages $E_{A11}$ and $E_{A12}$.

The same type of circuitry is used for the coolest load temperature selector 44, as hereinafter described, and it operates in the same manner except that it selects and transmits the smallest of the several input signals supplied thereto because the diodes are poled oppositely to those in the selector 42A.

In the description which follows, the voltage $E_{A1}$ will be called the zone A load temperature signal, but it will be understood that such voltage actually represents the highest one of the temperatures sensed at a plurality of locations on or in the load disposed in zone A of the furnace.

To provide the analog $E_{Ap}$ of the phantom set point for zone A, the first algebraic combining device 48A is an operational amplifier, which has its inverting or control input connected to receive the load temperature signal $E_{A1}$ through an input resistor 88A, and its non-inverting or reference input connected to receive the set point reference signal $E_S$. The operational amplifier is preferably an adjustable gain type to permit adjustment of the proportionality factor $K_{A1}$ as required by the thermal characteristics of the furnace zone A and the load 30A. For this reason, the amplifier 48A is shown as having a variable feedback resistor 90A.

The limiting of the phantom set point reference signal is conveniently effected by employing the operational amplifier 48A as one part of an operational amplifier diode selector network 92A. For this reason, the output of the amplifier 48A is shown to be connected to the cathode of a diode 94A having its anode connected to the upper end of a biasing resistor 96A. Moreover, there is a second operational amplifier 98A, which as shown, is a unity gain or voltage follower type with its reference or non-inverting input coupled to receive the analog $E_R$ of the maximum rated temperature $T_R$ for the furnace zone A, and its output coupled to the cathode of a diode 100A. The anode of the diode 100A, like the anode of the diode 94A, is connected to the upper end of the biasing resistor 96A. Finally to complete the selector network 92A, the lower end of the resistor 96A is connected to a suitable bias source of, say, $+12$ volts. It will, therefore, be appreciated that the output of the selector network 92A will be the smaller of the phantom set point analog $E_{Ap}$ or the limit temperature analog $E_R$. In other words, the output of the selector network 92A is the analog of the limited phantom set point given by Equations 9a and 9b, supra. The limit temperature signal $E_R$ may be taken from the wiper 99A of a potentiometer 99, and is thus adjustable to represent the limit temperature of the furnace zones in any given installation.

To derive the reference load temperature $E_m$, another operational amplifier diode selector network is employed as the selector 44. This selector comprises a plurality of unity gain or voltage follower operational amplifiers 102A to 102D, having their non-inverting inputs coupled to receive ones of the load temperature signals $E_{A1}$ to $E_{D1}$, and their outputs connected to the cathodes of respective diodes 106A to 106D. The anodes of the diodes are tied together to one end of a biasing resistor 108, and the other end of which is connected to a suitable biasing source of, say $+12$ volts. The output signal $E_m$ thus represents the temperature of the coolest one of the loads in the zones A to D.

The second algebraic combining device 50A provided to derive the weighting factor $K_{A2}\theta_A$ for zone A may suitably comprise a resistive summing circuit 112A and an adjustoble gain operational amplifier 114A. More particularly, the reference load temperature signal $E_m$ is applied to the minus input of a unity gain operational amplifier 116, the reference or non-inverting input of which is grounded, and which serves as an inverter. The output of the amplifier 116 is, in turn, connected to apply the inverted reference load temperature signal $-E_m$ to one branch of the resistive input circuit 112A, namely, the resistor 118A. At the same time, the load temperature signal $E_{A1}$ is applied to the other resistor 120A. These latter resistors are connected to the minus (inverting) input of the amplifier 114A, the non-inverting input of which is grounded. The operational amplifier 114A is provided with a variable feedback resistor 122A so that its gain may be adjusted to provide the proportionality constant $K_{A2}$ with a desired value. The output of the amplifier 114A can, therefore, be expressed as:

$$K_{A2}(E_m - E_{A1}) = -K_{A2}\theta_A \qquad (12)$$

which will be recognized as being the zone A weighting factor in inverted form, i.e., with a negative sign.

The third algebraic combining device 52A comprises a unity gain, voltage following operational amplifier 126A, having a two-branch resistor network 124A connected to its minus or inverting input. The limited phantom set point signal $E'_{Ap}$ is applied to one of the resistors 128A in this network, and the inverted weighting factor signal $-K_{A2}\theta_A$ is applied to the other resistor 130A. With the non-inverting or reference input of the amplifier 126A grounded, the output of the amplifier 126A is, therefore, simply the inverted value, $-E_{Apw}$, of the weighted phantom set point signal $E_{Apw}$, the feedback resistor 132A being sized to afford the desired unity gain.

Finally, to obtain the control signal $E_A$, the fourth algebraic combining device 58A includes yet another resistive network 134A and an adjustable gain operational amplifier 136A. Here the difference between the analogs of the weighted phantom set point $E_{Apw}$ and the zone A atmospheric temperature $E_{Aa}$ is determined. Accordingly, the resistor 138A of the resistive network is connected to receive the inverted signal $-E_{Apw}$ of the weighted phantom set point, while the other resistor 140 A is connected to receive the signal $E_{Aa}$ of the zone A atmospheric temperature. Suitably, the signal $E_{Aa}$ of the atmospheric temperature may be provided by passing the output of the atmospheric temperature sensor 56A through an amplifier 142A. With such input signals both applied via resistors to the inverting input of amplifier 136A, and its non-inverting input being grounded, the output of the amplifier 136A is simply the control signal $E_A$. Of course, the control signal $E_A$ may be boosted to whatever level may be desired by appropriate adjustment of the feedback resistor 144A provided for the amplifier 136A. Thus, the output of the amplifier 136A can be expressed as:

$$E_A = K_{A3}(E_{Apw} - E_{Aw}) \qquad (13)$$

The final controller 60A responds to the signal $E_A$ so as to vary the opening of the valve 24a, and thus the rate of heat energy supplied by the burner 16A into the furnace zone A (FIG. 1). As indicated above, the valve may be controlled with on-off or proportional action, and means (not shown) may be provided to effect a base or minimum rate of heat input to approximately offset normal heat loss from zone A to the external atmosphere. The important factor is that the rate of heat input to zone A is varied in accordance with variations in the signal $E_A$, but the absolute rate of heat input need not correspond to the absolute value of the signal $E_A$. And, since the signal $E_A$ includes the term $-K_{A2}\theta_A$ (see Equation 11, supra,) the rate of heating in zone A will be reduced to an extent generally commensurate with the degree to which the load temperature in zone A exceeds the temperature of the coolest load in all of the zones. The load in the zone which tends to heat up the most slowly determines the load reference temperature $T_m$, and this zone is not slowed down. But the other zone loads which tend "run away" from the zone whose load is heating most slowly are held back by the deviation factor $K_2\theta$ in their control functions, so that they do not overshoot the final set point before the reference zone load reaches that set point. All zone loads thus converge on the set point together (see the heavy curves in FIG. 3).

In summary, the plural zones (here four) are individually controlled to vary their rates of heat input according to variations in their respective final control signals, which as explained above, have the forms:

$$E_A = K_{A3}[E_s + K_{A1}(E_s - E_{A1})$$
$$- K_{A2}(E_{A1} - E_m) - E_{Aa}] \qquad (14)$$

$$E_B = K_{B3}[E_s + K_{B1}(E_s - E_{B1}) - K_{B2}(E_{B1} - E_m) - E_{Ba}] \quad (15)$$

$$E_C = K_{C3}[E_s + K_{C1}(E_s - E_{C1}) - K_{C2}(E_{C1} - E_m) - E_{Ca}] \quad (16)$$

$$E_D = K_{D3}[E_s + K_{D1}(E_s - E_{D1}) - K_{D2}(E_{D1} - E_m) - E_{Da}] \quad (17)$$

It will be recognized that limiting by the signal $E_R$, which is optional, is not represented in Equations 14 to 17. But it may be seen from these equations that the second term on the right side of each represents the load temperature error $\Delta$ multiplied by a predetermined gain factor $K_1$ for the zone in question; the first two terms of each represents a phantom set point for the zone in question; and the first three terms of each collectively constitute what has here been termed the weighted phantom set point for the zone in question. The difference between each weighted phantom set point and the atmosphere temperature in the corresponding zone (multiplied by an optional, predetermined gain factor $K_3$) constitutes the final control signal—and determines the rate of heat input to that zone.

It will become apparent from Equations 14 to 17 that the zone which contains the load that heats most slowly, and thus has the lowest temperature, will have the deviation factor reduced to zero in its control function. That is, assuming the zone D load temperature $T_{D1}$ is the lowest, then the signal $E_m$ will equal the signal $E_{D1}$ and $$(E_{D1} - E_m)$$

will be zero, and Equation 17 becomes $$E_D = K_{D3}[E_s + K_{D1}(E_s - E_{D1}) - E_{Da}] \quad (17')$$

Thus, zone D will be heated as fast as reasonably possible, since no load deviation factor reduces its final control signal $E_D$.

But on the other hand, if in these circumstances, the load in zone A is the hottest of the four, its load deviation factor $K_{A2}(E_{A1} - E_m)$ will be the greatest, and the zone A control signal $E_A$ will be depressed to the greatest degree, so that the zone A load does not reach and overshoot the set point before the zone D load reaches the set point. The zones B and C, having load temperatures exceeding that of zone D by lesser amounts than that of zone A, will have their control signals $E_B$ and $E_C$ depressed by lesser amounts corresponding to their smaller load temperature deviations.

From the foregoing, it will now be understood that the present invention makes it possible to bring the loads in a plurality of furnace zones all to the same final set point in a near-minimum heat-up time, and without overshoot of any load, by causing heat to be admitted at the fastest rate to the zone containing the load whose temperature rises most slowly. The other zones are automatically supplied with heat at a rate which is less than that for the slowest zone, so that they will not overshoot the set point. This result is obtained despite the fact that the sizes of the loads in the different zones, and indeed the thermal loss characteristics of the individual zones, may vary from batch to batch in the successive cycles of the furnace use.

I claim as my invention:

1. A method for bringing the temperatures of a plurality of loads respectively disposed in a plurality of furnace zones all to the same set point temperature, said method comprising the steps of sensing the temperature of each of said loads, signaling a reference load temperature, determining first differences between the set point temperature and each of the load temperatures, determining second differences between each of the load temperatures and the reference load temperature, and adjusting the rate of heat input to each of said zones as a function of the first difference and the second difference corresponding to that particular zone.

2. The method of claim 1 wherein the reference load temperature is the temperature of a predetermined one of said loads.

3. The method of claim 1 wherein the signaled reference load temperature at any given time is the temperature of the coolest of said loads at that time.

4. The method of claim 3 characterized in that the rate of heat input to each zone is increased as a function of the first difference and decreased as a function of the second difference corresponding to that particular zone.

5. The method of claim 4 including the further steps of additively combining the first difference for each zone with said set point temperature and subtractively combining the second difference for that zone with the result to determine a weighted phantom set point, and wherein the rate of heat input to each of said zones is adjusted as a function of the difference between the weighted phantom set point and the atmospheric temperature in that particular zone.

6. A method for reducing the temperature differences between a plurality of loads disposed in respective furnace zones each of which has a substantially independent heat input, said method comprising the steps of signaling a set point temperature for all of said loads, sensing the atmospheric temperature of each of said zones, sensing the temperature of each of said loads, determining for each of said loads the difference between said set point temperature and the load temperature to thereby obtain respective load temperature errors, multiplying each of said load temperature errors by a first constant and adding the result to the signaled set point to thereby obtain a respective phantom set point for each of said zones, signaling a reference load temperature which increases with time to a final level substantially equal to said set point temperature, determining for each of said loads the difference between said reference load temperature and the load temperature to thereby obtain load temperature differentials, multiplying each of said load temperature differentials by a second constant to thereby obtain a respective weighting factor for each of said zones, combining for each of said zones the phantom set point therefor with the weighting factor therefor to thereby obtain a respective weighted phantom set point temperature for each of said zones, comparing for each of said zones the atmospheric temperature thereof with the weighted phantom set point therefor, and controlling the heat input to each zone to add additional heat only when the weighted phantom set point temperature therefor is greater than the atmospheric temperature thereof.

7. The method of claim 6 wherein the reference load temperature is the temperature of the coolest of said loads, and the weighting factor for each of the zones is subtractively combined with the phantom set point therefor, whereby the weighted phantom set point for the zone containing the coolest of said loads is greater than the weighted phantom set points for the other zones.

8. The method of claim 6 wherein said first constant is selected to provide heating of said loads to said set point temperature at substantially the maximum permissible rate consistent with preventing any of said load temperatures from overshooting said set point temperature, and said second constant is selected to limit the maximum temperature differential between the hottest and coolest of said loads to a predetermined permissible range.

9. The method of claim 6 including the further step of limiting each of said phantom set points to a predetermined maximum level to thereby prevent overheating of said furnace zones.

10. The method of claim 9 wherein said first constant is selected to provide heating of said loads to said set point temperature at substantially the maximum permissible rate consistent with preventing any of said load temperatures from overshooting said set point temperature, and said second constant is selected to limit the maximum temperature differential between the hottest and coolest of said loads to a predetermined permissible range.

11. In a system for controlling the rate of heat input to each of a plurality of furnace zones containing respective ones of a plurality of loads to be brought all to the same set point temperature, the combination comprising means for producing a plurality of error signals each of which varies as the difference between said set point temperature and the temperature of the load in a respective one of said zones, means for producing a plurality of deviation signals each of which varies as the difference between the temperature of the load in a respective one of said zones and a common reference temperature, means for producing a plurality of final control signals which vary in part according to an algebraic combination of factors proportional to the error signal and the deviation signal for respective ones of said zones, and means for adjusting the rate of heat input to each of said zones in accordance with variations in the final control signal which corresponds to that particular zone.

12. In a system for controlling the rate of heat input to each of a plurality of furnace zones A, B, C . . . each containing a load to be brought to the same set point temperature $T_s$, the combination comprising a plurality of temperature sensing means for producing load signals $E_{A1}$, $E_{B1}$, $E_{C1}$ . . . representing the temperatures of the respective loads, means for producing a signal $E_m$ representing a reference load temperature $T_m$, means for algebraically combining each of said load temperature signals with said reference temperature signal to produce a plurality of difference signals $(E_{A1}-E_m)$, $(E_{B1}-E_m)$ $(E_{C1}-E_{Cm})$, . . . , and means for varying the rate of heat input to each of said zones as a function of a final control signal which varies in part according to the value of that one of said difference signals which corresponds to that zone, thereby to maintain the temperatures of all of said loads more nearly equal despite differences in the size of the loads and the thermal characteristics of the furnace zones.

13. The control system of claim 12 wherein the means for producing said signal $E_m$ representing the reference temperature $T_m$ includes a first selector means coupled to all of said temperature sensing means and responsive thereto for producing an output signal representative of the temperature $T_m$ which is the lowest of said load temperatures $T_{A1}$, $T_{B1}$, $T_{C1}$ . . . .

14. The control system of claim 13 wherein each of said temperature sensing means includes a plurality of temperature sensors each for providing a signal representative of the temperature of a respective localized area of the associated load, and a second selector means coupled to receive the signals from said temperature sensors for providing the signal representative of the temperature of the hottest of said areas as the output signal of said temperature sensing means.

15. The control system of claim 14 wherein said signals are variable voltages, and said first selector means and each of said second selector means comprise a respective plurality of operational amplifiers with negative feedback, the individual outputs of such amplifiers in each selector means being coupled through similarly poled diodes to a common output terminal and the negative feedback for each amplifier being taken from the common output terminal.

16. The combination set forth in claim 13 further including means for producing a set point signal $E_s$ representing said set point temperature $T_s$, means for algebraically combining said set point signal with each of said load signals to produce a plurality of error signals $(E_s-E_{A1})$, $(E_s-E_{B1})$, $(E_s-E_{C1})$ . . . corresponding to the respective zones, means for algebraically combining said difference signals with said error signals to produce composite signals $[K_{A1}(E_s-E_{A1})-K_{A2}(E_{A1}-E_m)]$, $$[E_{B1}(E_s-E_{B1})-K_{B2}(E_{B1}-E_m)]$$

$[K_{C1}(E_s-E_{C1})-K_{C2}(E_{C1}-E_m)]$ . . . where the symbols K represent proportionality factors, and characterized in that said means for varying the rate of heat input to each of said zones includes means for varying such rate as a function of a final control signal which varies in part according to the value of that one of said composite signals which correspond to that zone.

17. The combination set forth in claim 16, further including temperature sensing means for producing air signals $E_{Aa}$, $E_{Ba}$, $E_{Ca}$ . . . representing the temperatures of the air in respective ones of said zones, means for algebraically combining said composite signals and said set point signal to produce a plurality of weighted phantom set point signals $E_{pw}$ which for the respective zones vary as the quantities $$E_s+[K_{A1}(E_s-E_{A1})-K_{A2}(E_{A1}-E_m)]$$
$$E_s+[K_{B1}(E_s-E_{B1})-K_{B2}(E_{B1}-E_m)],$$
$$E_s+[K_{C1}(E_s-E_{C1})-K_{C2}(E_{C1}-E_m)] \ldots$$

means for algebraically combining said weighted phantom set point signals with said air signals to produce final control signals which respectively vary as the difference between the weighted phantom set point signal for a given zone and the air signal for that zone, and means for varying the rate of heat input to each of said zones as a function of the final control signal for that zone.

18. In a system for controlling the rate of heat input to each of a plurality of furnace zones A, B, C . . . containing respective ones of a plurality of loads to be brought all to the same set point temperature, means for producing a first signal $E_s$ representing said set point temperature, means for producing a plurality of second signals $E_{A1}$, $E_{B1}$, $E_{C1}$ . . . which vary according to and represent the temperatures of the loads in respective ones of said zones, means for producing a third signal $E_m$ representing a reference temperature, means for producing a plurality of fourth signals $E_{Aa}$, $E_{Ba}$, $E_{Ca}$ . . . which vary according to and represent the temperatures of the atmospheres in respective ones of said zones, a plurality of signal processing channels each corresponding to one of said zones, the channel for any given zone, designatable for convenience as the zone A, including means for algebraically combining said corresponding first, second, third and fourth signals to produce a final control signal $E_A$ which varies according to the function, $$E_A=E_s+K_{A1}(E_s-E_{A1})-K_{A2}(E_{A1}-E_m)-E_{Aa}$$

where $K_{A1}$ and $K_{A2}$ are factors of proportionality, and means for varying the rate of heat input to each of said zones as a function of the final control signal produced by the channel corresponding to that zone.

19. The combination set forth in claim 18, further characterized in that said means for producing said third signal includes means for making the third signal vary as and represent the temperature of that one of the loads which is the coolest.

20. In a system for controlling the rate of heat input to each of a plurality of furnace zones containing respective ones of a plurality of loads to be brought all to the same set point temperature, the combination comprising, a first plurality of temperature sensing means for producing first signals representing the temperatures of respective ones of the loads; means for producing a second signal representing said set point temperature; means for producing a third signal representing a reference load temperature; a second plurality of temperature sensing means for producing fourth signals representing the temperature of the atmosphere in respective ones of said zones; a plurality of control channels each corresponding to one of said zones; each of said channels including a first combining means for producing a first difference signal $K_1\Delta$ proportional by a factor $K_1$ to the difference $\Delta$ between said second signal and the first signal for the corresponding zone, a second combining means for producing a second difference signal $K_2\theta$ proportional by a factor $K_2$ to the difference $\theta$ between said first signal for the corresponding zone and said third signal, a third combining devices for producing a weighted phantom set point signal which varies as an algebraic combination of said second signal, said first difference signal, and said second difference signal, a fourth combining device for producing a control signal when said weighted phantom set point signal exceeds the fourth signal for the corresponding zone, and means responisve to said control signal for controlling the input of heat into the corresponding zone.

21. The combination set forth in claim 20 wherein the means for producing said third signal includes a selector means coupled to receive all of said first signals and to transmit as said third signal that one of the first signals which represents the temperature of the coolest one of said loads.

22. The combination set forth in claim 21 wherein said third combining means combines said second signal additively with said first difference signal and subtractively with said second difference signal whereby the weighted phantom set point temperature represented by the signal produced by said third combining means is increased to a level above said set point temperature by an amount determined by said first difference signal and is reduced from such level by an amount determined by said second difference signal.

23. The combination set forth in claim 22 wherein said first factor $K_1$ is selected to provide heating of the load in said zone to said set point temperature at substantially the maximum permissible rate consistent with preventing the temperature of said load from overshooting said set point temperature, and said second factor $K_2$ is selected to limit the maximum deviation between the hottest and the coolest of said loads to a predetermined range.

24. The combination set forth in claim 20 wherein the control signal provided by said fourth combining means is representative of the difference between said weighted phantom set point signal and said fourth signal, and wherein said means responive to said control signal varies the rate of input of heat into the corresponding zone in proportion to variations in the control signal.

25. The combination set forth in claim 20 further including in each of said control channels means for limiting the signal provided by said third combining device to thereby limit the weighted phantom set point signal to a predetermined maximum value.

26. The control system of claim 21 wherein said limiting means includes means coupled between said first combining device and said third combining device for limiting the first difference signal $K_1\Delta$ to a predetermined maximum level.

27. The method of claim 6 including the further step of limiting each of the weighted phantom set points to a predetermined maximum level to thereby prevent overheating of said furnace zones.

References Cited

UNITED STATES PATENTS

| | | | |
|---|---|---|---|
| 1,973,452 | 9/1934 | Wadman et al. | 263—10 |
| 2,998,195 | 8/1961 | Kahn. | |
| 3,128,042 | 4/1964 | Daneman. | |
| 3,462,078 | 8/1969 | Houchman | 263—36 X |

JOHN J. CAMBY, Primary Examiner

U.S. Cl. X.R.

236—15, 78; 263—36

PO-1050
(5/69)

UNITED STATES PATENT OFFICE
CERTIFICATE OF CORRECTION

Patent No. 3,529,811      Dated September 22, 1970

Inventor(s) Newell Clark Grove

It is certified that error appears in the above-identified patent and that said Letters Patent are hereby corrected as shown below:

Column 2, line 4, "temeprature" should read -- temperature --; line 16, "wihout" should read -- without --. Column 3, line 37 "effectvie" should read -- effective --; line 40, "what" should read -- what- --; line 41, "on" should read -- one --. Column 5, line 13, "A-B" should read -- A-D --. Column 8, line 31, "$E_B$," should read -- $E_{B1}$ --. Column 9, line 18, "adapted" should read -- adopted --. Column 10, line 39, after "to" insert -- be --, and "78" should read -- 78A --; line 64, "unit" should read -- unity --; Column 11, line 49, before the word "ones" insert the word -- respective --; line 61, "adjustoble" should read -- adjustable --. Column 12, line 62, after the word "tend" insert the word -- to --. Column 15, line 28, "$E_{Cm}$" should read -- $E_m$ --; line 70, the first occurence of "$E_{B1}$" should read -- $K_{B1}$ --. Column 16, line 11, after "]" insert a comma (,). Column 18, line 5, "responive" should read -- responsive --.

SIGNED AND
SEALED
DEC 15 1970

(SEAL)
Attest:

Edward M. Fletcher, Jr.
Attesting Officer

WILLIAM E. SCHUYLER, JR.
Commissioner of Patents